United States Patent
Stewart et al.

[19]

[11] Patent Number: 5,911,285
[45] Date of Patent: Jun. 15, 1999

[54] EROSION RESISTANT DOWNHOLE MUD DIVERTER TOOL

[76] Inventors: Arthur Deacey Stewart, The South Manse, Panmuir Gardens, Potterton, Aberdeen AB2 8EW, United Kingdom; Mark William Craig, 22 Woodend Drive, Aberdeen AB2 6YJ, United Kingdom

[21] Appl. No.: 08/776,550

[22] PCT Filed: Aug. 1, 1995

[86] PCT No.: PCT/GB95/01817

§ 371 Date: Jan. 31, 1997

§ 102(e) Date: Jan. 31, 1997

[87] PCT Pub. No.: WO96/04458

PCT Pub. Date: Feb. 15, 1996

[30] Foreign Application Priority Data

Aug. 1, 1994 [GB] United Kingdom ............... 9415500

[51] Int. Cl.⁶ ............................................. E21B 21/10
[52] U.S. Cl. ................. 175/317; 166/222; 166/332.4; 175/324; 175/424
[58] Field of Search ................. 175/324, 317, 175/424; 166/222, 332.4

[56] References Cited

U.S. PATENT DOCUMENTS

| 2,634,101 | 4/1953 | Sloan | 175/324 |
|---|---|---|---|
| 3,005,507 | 10/1961 | Clark, Jr. et al. | 175/324 |
| 3,208,527 | 9/1965 | Bayless | 166/313 |
| 3,358,770 | 12/1967 | Zandmer | 166/289 |
| 3,566,980 | 3/1971 | Scroggins | 175/317 |
| 3,997,010 | 12/1976 | Rilling | 175/317 |
| 4,341,273 | 7/1982 | Walker et al. | 175/339 |
| 4,583,603 | 4/1986 | Dorléans | 175/324 |
| 4,844,182 | 7/1989 | Tolle | 175/61 |
| 5,007,454 | 4/1991 | Lee, II | 137/508 |
| 5,407,020 | 4/1995 | Beavers | 175/317 |
| 5,533,571 | 7/1996 | Surjaatmadja et al. | 166/222 |

FOREIGN PATENT DOCUMENTS

| 1114067 | 5/1968 | United Kingdom . |
|---|---|---|
| 2054008 | 2/1981 | United Kingdom . |
| 2088931 | 6/1982 | United Kingdom . |
| 2170529 | 8/1986 | United Kingdom . |
| 93/25794 | 12/1993 | WIPO . |

*Primary Examiner*—Hoang C. Dang
*Attorney, Agent, or Firm*—Rather & Prestia

[57] ABSTRACT

An erosion resistant downhole diverter tool (210) comprises a generally cylindrical body (212) which may be configured as a slick sub or may include stabilizing blades (260). Located within the body 212 are a plurality of erosion-resistant, removable, cylindrical inserts (220). Each insert has an aperture (222) formed therein, aligned with a corresponding aperture (218) formed in the cylindrical body (212). Located within the apertures (218) in the cylindrical body (212) are pressure responsive, normally-closed valve assemblies (300), incorporating jet nozzles, which open in response to increased fluid pressure within the tool to provide fluid jets directed into the annulus surrounding the tool in a borehole or the like. The upper ends of the stabilizer blades (260) may include cutting structures to provide a back-reaming function. In alternative embodiments, the valve assemblies are omitted and replaced by simple jet nozzles, and the interior of the inserts is configured to promote fluid flow through the nozzles without increased fluid pressure. The inserts and nozzle components in contact with fluid are formed from erosion-resistant material. The tool allows fluid diversion functions to be performed without interrupting drilling operations.

25 Claims, 8 Drawing Sheets

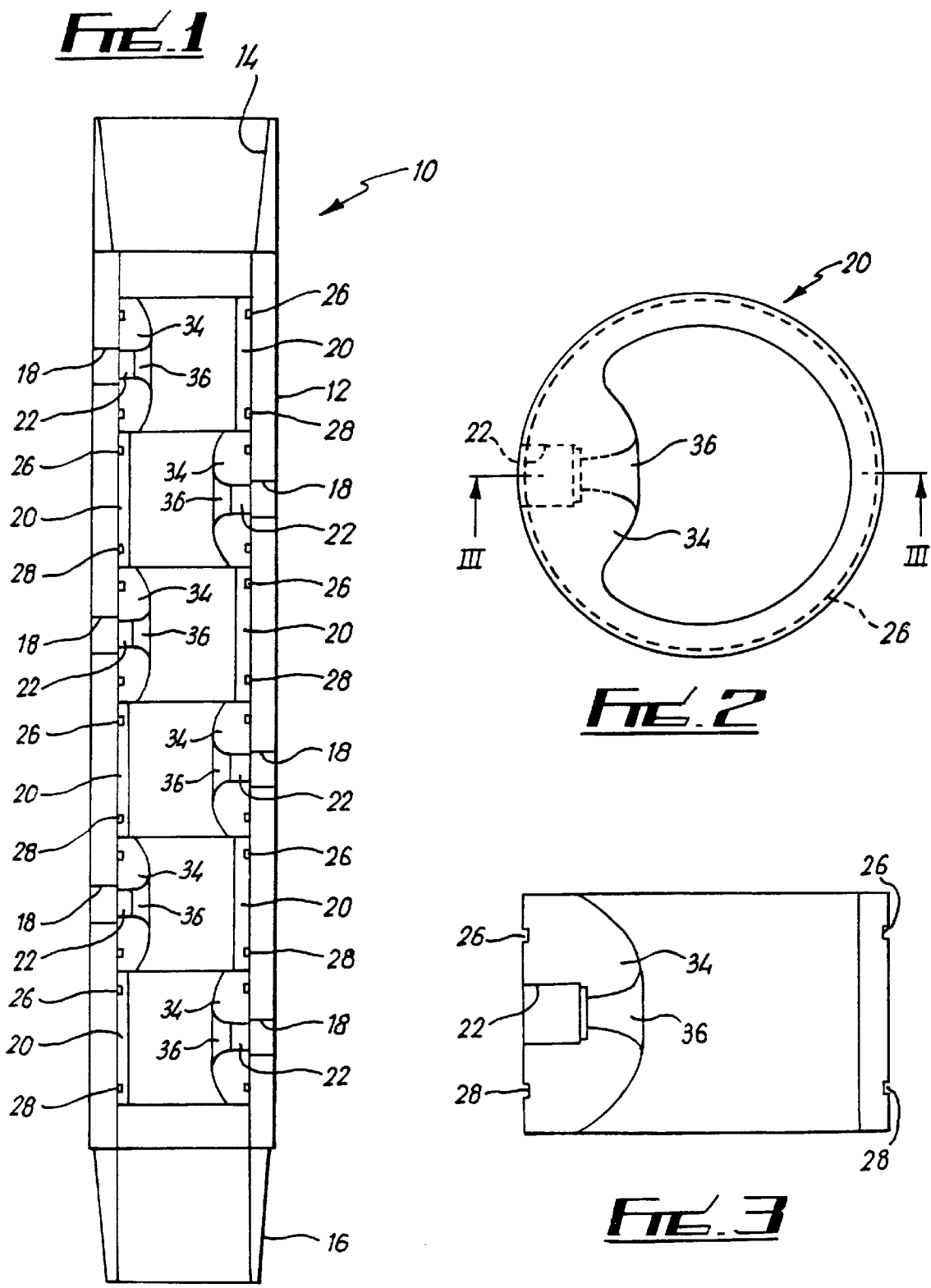

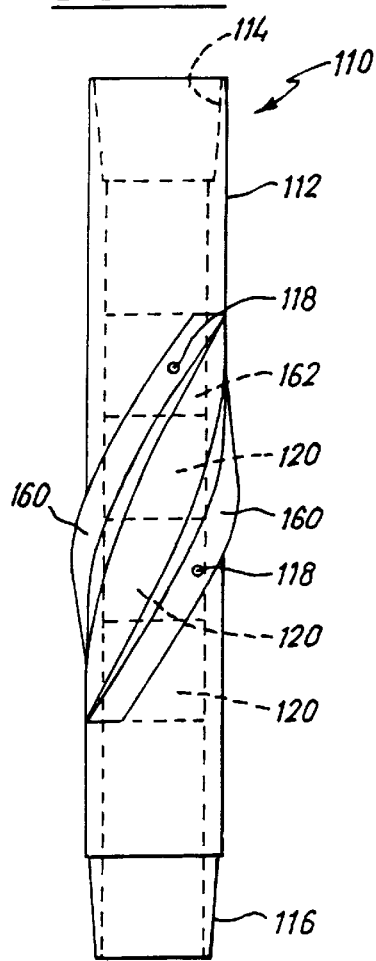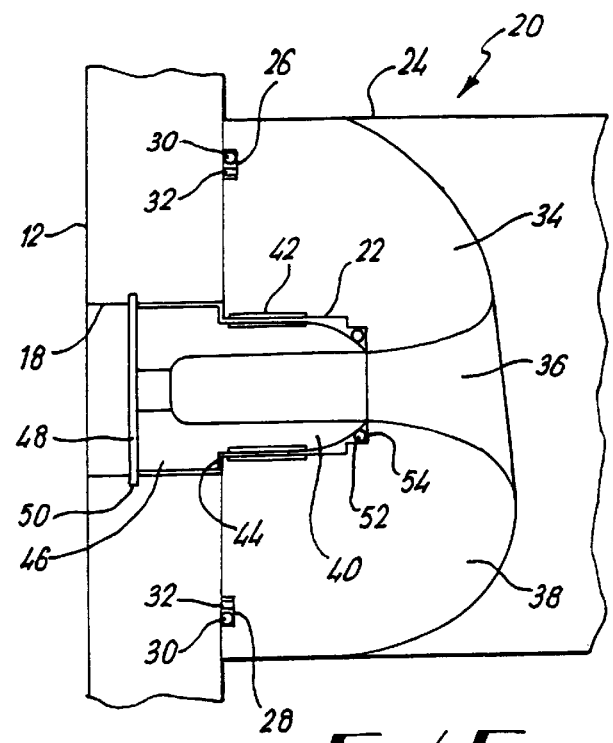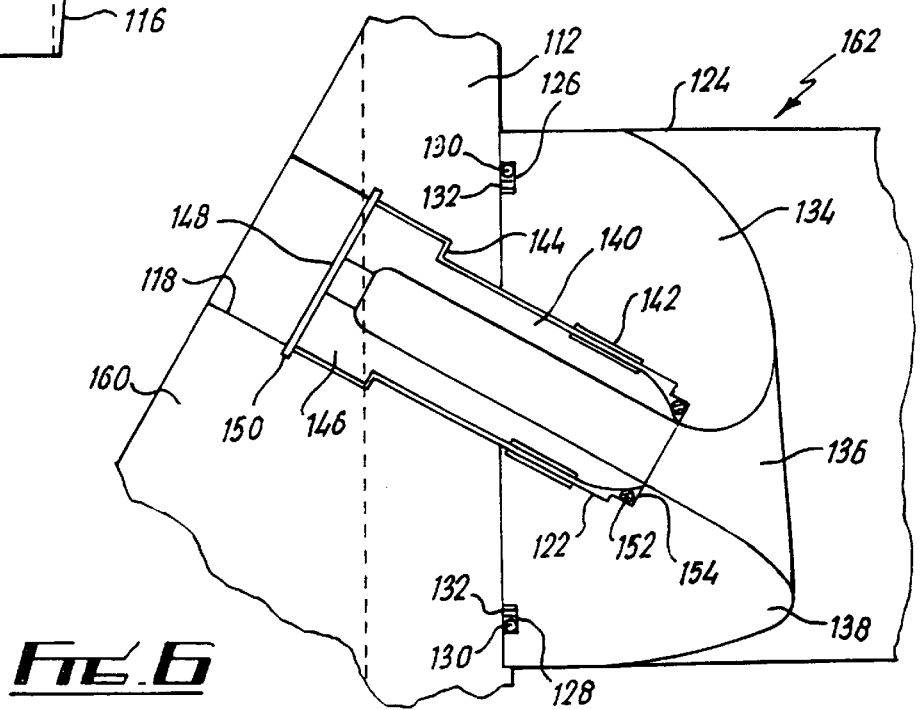

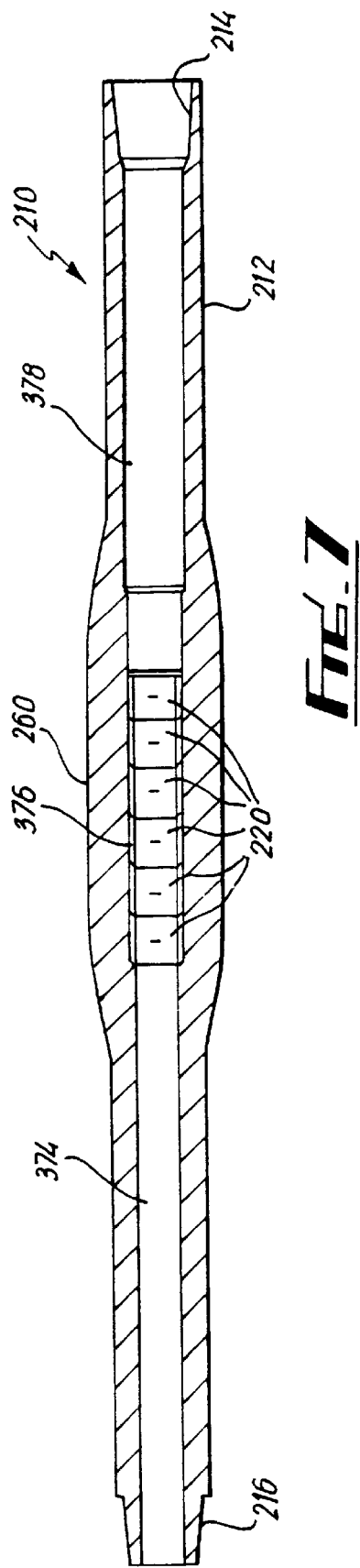
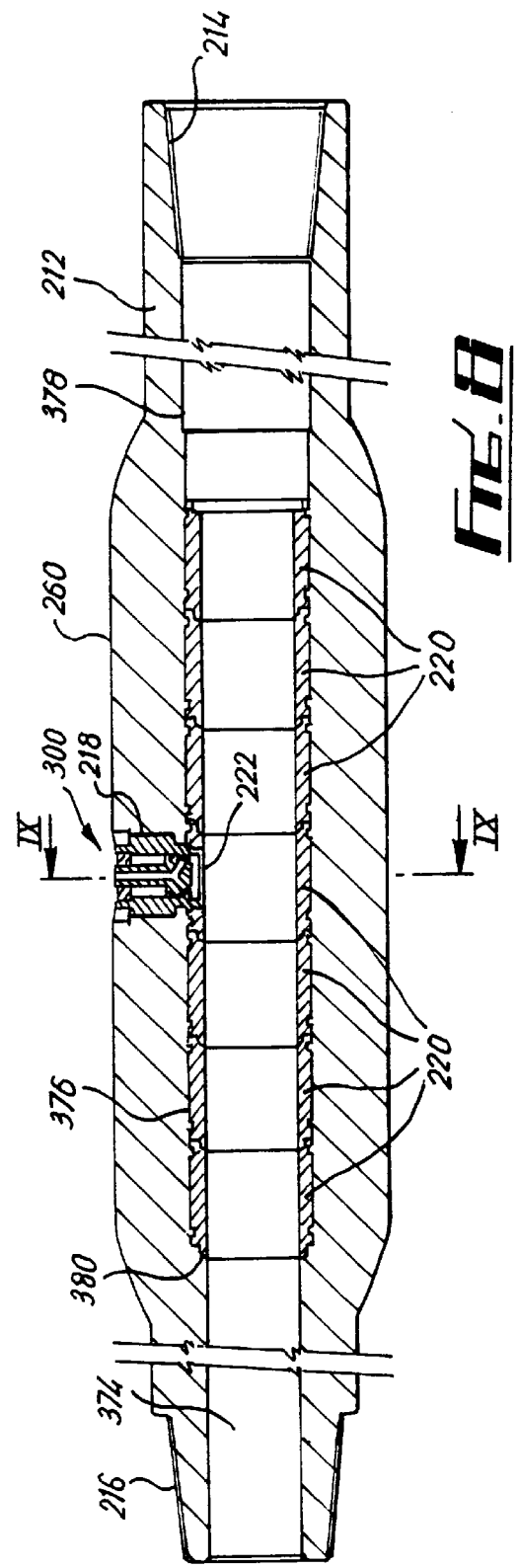

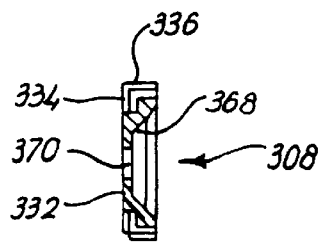
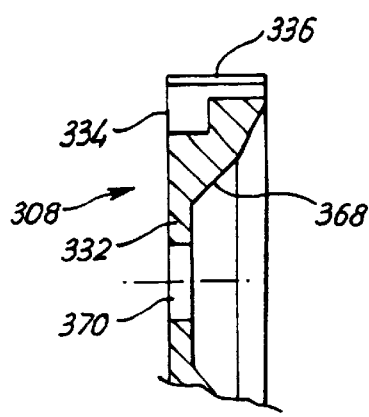
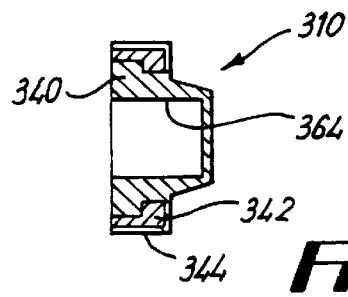
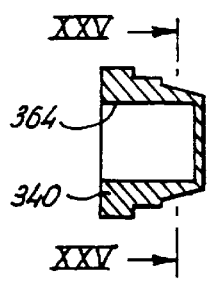
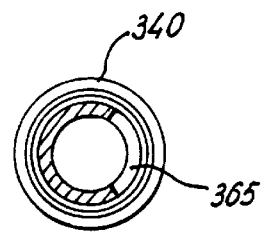
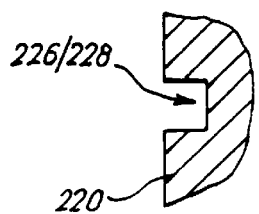
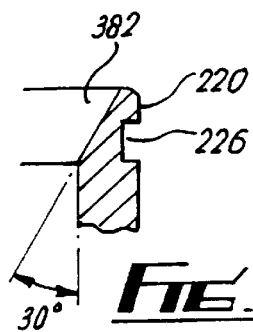

EROSION RESISTANT DOWNHOLE MUD DIVERTER TOOL

The present invention relates to downhole tools for use in the drilling of oil wells in the like, for diverting a portion of the flow of drilling fluid (mud) through a drill string out of apertures formed in the tools, which form part of the drill string, for the purpose of assisting in the clearance of cuttings from the annulus around the drill string. The invention is applicable particularly, but not exclusively, to high angle or horizontal long-reach wells.

In the drilling of oil wells or the like, cuttings from the drilling operation are flushed back to the surface of the bore by drilling fluid which circulates down through the interior of the drill string and returns to the surface through the annulus around the drill string. In high angle or horizontal wells, difficulties are often experienced in effecting adequate flushing of such cuttings.

In order to alleviate such problems, it is known to deploy a circulating sub in the drill string. A circulating sub is simply a cylindrical sub having an aperture formed in its side through which drilling fluid is diverted out to the annulus around the drill string for flushing cuttings. The sub is plugged at its lower end in order to divert the fluid, so that drilling operations have to be interrupted while the circulating sub is deployed. Circulating subs of this type also have a limited life owing to erosion by the abrasive fluid.

A further problem associated with long reach wells is that the formation through which the bore is formed is liable to collapse around the drill string, trapping the drilling assembly.

It is a first object of the present invention to provide fluid diverter tools which allow drilling fluid to be diverted for enhanced flushing of cuttings and other debris without interrupting drilling operations.

It is a second object of the invention to provide fluid diverter tools having enhanced resistance to erosion.

It is a further object of the invention to provide diverter tools further adapted to allow back-reaming of a collapsed formation to free a trapped drill string.

In accordance with the invention there is provided a downhole fluid diverter tool comprising: a generally cylindrical body having an axial through-bore and adapted for connection within a drill string, said body having at least one aperture formed in a side wall thereof; at least one generally cylindrical insert having an axial through bore and having at least one aperture formed in a side wall thereof; means for locating said insert within said cylindrical body such that said apertures of the body and the insert are aligned with one another; and means whereby a proportion of a flow of drilling fluid passing through the cylindrical body, in use, may be diverted through said apertures.

Preferably, said body has a plurality of apertures and said at least one insert provides a corresponding number of apertures aligned therewith. Most preferably, an insert having a single aperture is provided for each aperture formed in the body, said apertures formed in the body being spaced along its length and said inserts being stacked in the interior thereof. More preferably still, the apertures in the body are disposed in a helical path along its length.

Preferably also, said at least one insert is formed from erosion resistant material; most preferably said material is tungsten carbide.

Preferably also, the tool further includes a nozzle assembly located in each of said apertures in said body. Most preferably, said nozzles are located in the apertures of said body and engage said inserts, thereby also providing said locating means.

In a variation of the invention, said generally cylindrical body is further provided with a plurality of stabilising blades on its exterior surface and said apertures extend through said blades.

Preferably, said blades are provided at their uppermost ends with cutting elements whereby rotation of the tool may provide a back-reaming action. In this case, the uppermost aperture preferably extends through one of said blades at an angle to the side wall of the cylindrical body, such that fluid diverted therethrough, in use, is directed upwardly.

Preferably also, the exterior walls of said inserts are adapted to sealingly engage the interior wall of said body.

In certain embodiments of the invention, the interior surface of said insert is configured in the vicinity of said aperture to effect said diversion of said drilling fluid.

In these embodiments of the invention, it is preferred that the interior wall of the insert in the vicinity of the aperture formed therein varies in thickness to provide a generally convex bulge around the aperture. Preferably also, the walls of the entrance to the aperture converge in the direction extending towards the exterior surface of the insert and are generally convex in cross section.

Preferably also, the portion of the bulge lying below the aperture in the direction of fluid flow through the insert extends a greater distance towards the centre of the insert than does that portion lying above the aperture.

In a preferred embodiment of the invention, said apertures in the cylindrical body are fitted with normally-closed, pressure-responsive valve means, said diversion of said drilling fluid being effected, in use, by increasing the fluid pressure in the interior of said cylindrical body such that said valve means open and a proportion of said drilling fluid exits from the cylindrical body through said apertures.

Preferably, said valve means comprises a nozzle holder mounted in said aperture in said cylindrical body, nozzle slidably mounted in said nozzle holder and having a fluid passage formed therethrough and resilient bias means adapted to urge said nozzle in a direction towards the interior of said tool so as to close said fluid passage.

Preferably also, said nozzle is adapted to move against the force of said resilient bias means in an outward direction, in response to a predetermined fluid pressure within the interior of said tool, so as to open said fluid passage.

Preferably also, said nozzle is mounted between a fluid inlet nozzle member located at an inner end of said nozzle holder and a jet nozzle located at an outer end of said nozzle holder. Most preferably, said nozzle includes a head portion having a frusto-conical surface adapted to engage a corresponding surface of said inlet nozzle member when said valve is closed, and a shaft portion extending from said head portion and adapted to engage said jet nozzle.

Preferably also, said fluid passage in said nozzle comprises a plurality of passages extending through said head portion from said frusto-conical surface and intersecting a bore formed in said shaft portion.

Preferably also, said resilient bias element surrounds the shaft of said nozzle between the head portion thereof and said jet nozzle.

Preferably also, said nozzle, said inlet nozzle member and said jet nozzle are formed from erosion resistant material, such as tungsten carbide.

Preferably, the tool includes a plurality of said inserts, in which the upper end of each insert includes a shoulder adapted to be engaged by a corresponding shoulder formed on the lower end of a vertically adjacent insert.

Preferably also, the through-bore of said cylindrical body includes a lowermost portion having a first internal diameter smaller than the external diameter of said inserts, an insert-receiving portion having a second internal diameter larger than said first internal diameter and substantially equal to or greater than the external diameter of said inserts, and a shoulder formed between said lowermost portion and said insert-receiving portion, said shoulder being similar in configuration to the shoulder formed on the uppermost ends of said inserts.

Embodiments of the invention will now be described, by way of example only, with reference to the accompanying drawings in which:

FIG. 1 is a schematic, sectional side view of a first diverter tool embodying the invention;

FIG. 2 is a schematic plan view of one of a plurality of inserts forming part of the tool of FIG. 1;

FIG. 3 is a schematic sectional view on line III—III of FIG. 2;

FIG. 4 is a schematic side view of a second diverter tool, embodying the invention;

FIG. 5 is a detailed sectional view of a portion of the insert of FIGS. 2 and 3 in situ in the tool of FIG. 1;

FIG. 6 is a detailed sectional view of a portion of the topmost insert in situ in the tool of FIG. 4;

FIG. 7 is a sectional side view of a preferred embodiment of a diverter tool in accordance with the invention;

FIG. 8 is a more detailed sectional side view of the tool of FIG. 7;

FIG. 21 is a sectional side view of an inlet nozzle forming part of the valve assembly of FIGS. 13 and 14;

FIG. 22 is a detailed view of a portion of the inlet nozzle of FIG. 21;

FIG. 23 is a sectional side view of a jet nozzle forming part of the valve assembly of FIGS. 13 and 14;

FIG. 24 is a sectional side view of a jet nozzle forming part of the assembly of FIG. 23;

FIG. 25 is a sectional end view online XXV—XXV of FIG. 24;

FIG. 26 is a detailed sectional view of an O-ring groove of the inserts of FIG. 12; and FIG. 27 is a detailed sectional view of a portion of the uppermost rim of the uppermost one of a plurality of inserts as shown in FIG. 12 included in the tool of FIG. 7.

Figure 9:
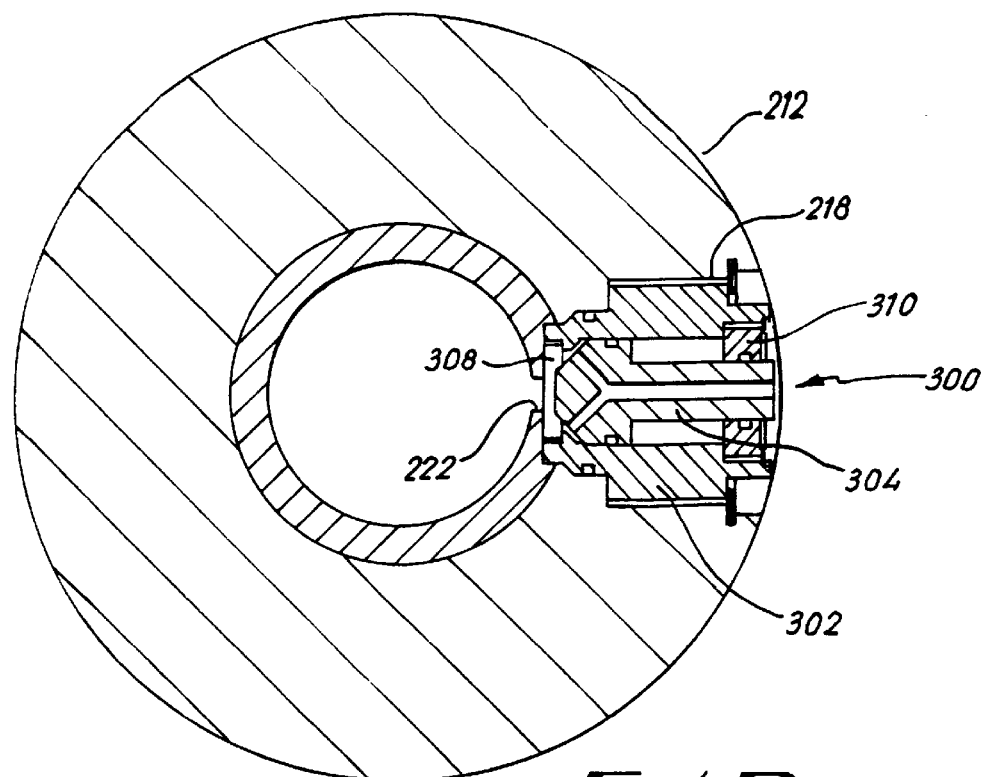
FIG. 9 is cross-section on line IX–IX of FIG. 8.
Figure 10:
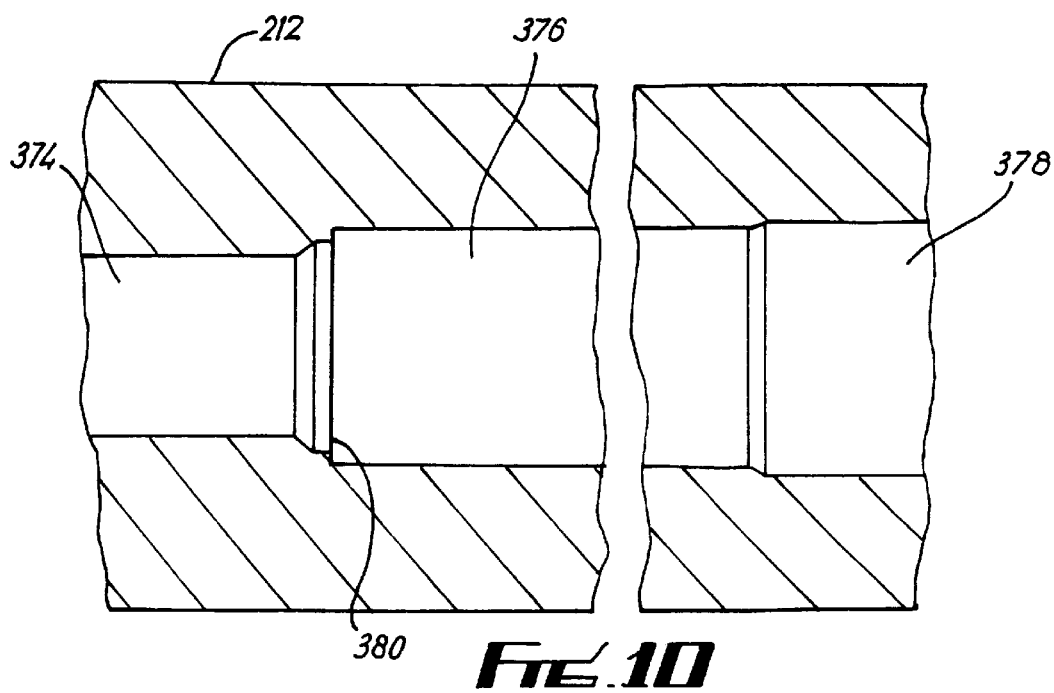
FIG. 10 is a detailed sectional side view illustrating the internal bore of the cylindrical body of the tool of FIG. 7.
Figure 11:
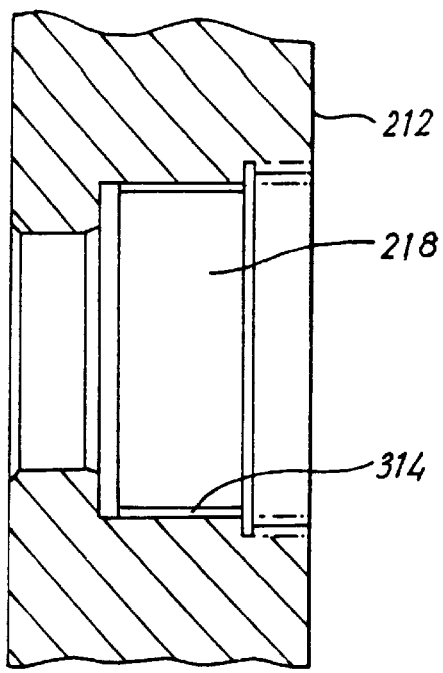
FIG. 11 is a detailed sectional side view showing one of a plurality of apertures formed in the cylindrical body of the tool of FIG. 7.

Referring now to the drawings, FIG. 1 is a schematic sectional view of a first embodiment of a fluid diverter tool 10 in accordance with the present invention. The tool comprises a slick sub having a generally cylindrical body portion 12. The body 12 has a central through-bore and is adapted for connection within a drill string by any suitable means such as an internally threaded box 14 and an externally threaded pin 16, typically a 4.5 inch (11.43 cm) IF box and pin. The body 12 has a plurality of fluid apertures 18 spaced along its length, preferably disposed along a helical path. In the example illustrated, successive apertures 18 are angularly displaced 180 degrees from one another around the circumference of the body 12. However, the pitch of the helical path may be varied so that the angular displacement between successive apertures 18 is other than 180 degrees.

The tool further comprises a plurality of cylindrical inserts 20 removably located within the through-bore of the body 12 and sealably engaging the interior wall thereof. In this example the inserts correspond in number to the apertures 18 of the body 12, and each insert 20 has a fluid aperture 22 which is aligned with a corresponding aperture 18. The inserts 20 are maintained in position with their apertures 22 aligned with the body apertures 18 by locating means which will be described in greater detail below. In this example there is one insert 20 for each body aperture 18. However, the inserts might be formed with more than one aperture for alignment with corresponding body apertures.

FIGS. 2, 3 and 5 illustrate the inserts 20 in greater detail. Each insert 20 comprises a generally cylindrical body 24 having an outside diameter slightly smaller than the internal diameter of the tool body 12. The insert 20 is adapted to sealably engage the interior wall of the body 12 by means of sealing elements located in first and second annular grooves 26, 28 disposed above and below the insert aperture 22. The sealing elements may suitably comprise an O-ring 30 and a back-up teflon ring 32 (FIG. 5) in each groove 26, 28.

The inner wall of the insert body 24 is thickened in the vicinity of the insert aperture 22 so as to form a generally convex bulge 34 around the aperture 22. The entrance 36 to the aperture 22 at the apex of the bulge 34 is configured such that-the walls thereof converge in the direction extending towards the exterior surface and are generally convex in cross section, so that the entrance 36 is shaped like the bell of a trumpet. Most preferably, as is best seen in FIG. 5, the lower half 38 of the bulge 34, below the entrance 36, projects further towards the central axis of the insert body 24 than does the upper half of the bulge 34.

The tool 10 preferably also includes a jet nozzle 40 inserted in each of the aligned tool and insert apertures 18, 22, as seen in FIG. 5. As shown, the nozzle 40 has an externally threaded portion 42 adapted to engage a corresponding internal thread of the insert aperture 22. The body aperture 18 has a larger diameter than the insert aperture 22, and the nozzle 40 further includes an external annular shoulder 44 which engages the outer surface of the insert around the periphery of the insert aperture 22, and an outer portion 46 disposed outwardly of the shoulder 44 located within the body aperture 18. The engagement of the nozzle 40 with the body aperture 18 and the insert aperture 22 thus also serves to locate the insert 20 within the body 12 and to align the respective apertures 18, 22.

In order to prevent the nozzle from unscrewing, it may be positively retained within the body aperture 18 by any suitable means, such as a circlip 48 located in an annular groove 50 extending around the wall of the body aperture 18. The nozzle may also be sealed to the insert aperture by means of a sealing element, such as an O-ring 52 seated against a shoulder 54 formed in the insert aperture adjacent the bell-shaped entrance 36. The outer portion 46 of the nozzle 40 is preferably a slight clearance fit with the body aperture 18, to accommodate misalignment, and an additional sealing element (not shown) could be included therebetween. Such an element would provide additional sealing from the outside of the tool and would also serve to take up any relative movement between the body 12 and the insert 20 and would facilitate disassembly of the tool.

In use, the tool 10 would be connected in a drill string (not shown). A proportion of the drilling fluid passing downwards through the drill string is diverted outwardly through the apertures 18, via the jet nozzles 40, in order to assist in the clearance of cuttings and other debris from the annulus around the drill string. The configuration of the insert walls, ie the bulges 34 and bell-shaped aperture entrances 36, assist in diverting a useful proportion of the fluid flow through the apertures 18. The inserts 20 are removable and can be replaced or refurbished as they are eroded by the abrasive fluid. The inserts 20 may also be formed from erosion resistant material, such as tungsten carbide, in order to extend their life span, and the thickening of the walls around the apertures 22 further enhances their erosion-resistance. The jet nozzles 40 are preferably also formed from erosion resistant material, such as tungsten carbide.

FIG. 5 shows a further embodiment of the invention in which the tool 110 is configured as a stabiliser, the cylindrical body 112 being provided with a plurality of integrally formed stabiliser blades 160, and the body apertures 118 being formed so as to extend through the blades 160. Features of this embodiment which are common to the first embodiment have like reference numerals, prefixed "1".

The stabiliser blades 160 may be of any suitable configuration, such as are well known in the art. In this example there are three helical blades 160, only two of which are visible in FIG. 4, and four body apertures 118, two of which are visible, formed in alternate blades 160.

The inserts 120 for the three lowermost apertures 118 (one of which is visible) may be identical to those of the tool 10 as illustrated in FIGS. 1, 2, 3 and 5. The insert 162 for the uppermost aperture 118 is preferably modified as shown in FIG. 6, such that the apertures 118, 122 extend upwardly and outwardly at an angle (suitably 30 degrees) to the longitudinal axis of the tool 110. As can be seen in FIG. 6, the arrangement of the body aperture 118, the insert aperture 122, the bulge 134, the aperture entrance 136 and the nozzle 140 are generally similar to those of FIG. 5, except that the apertures 118, 122 are angled and extended, the shapes of the bulge 134 and entrance 136 are modified appropriately and the nozzle 140 is extended. The outer end of the nozzle 140 is disposed within that part of the body aperture 118 which extends through the stabiliser blade 160. It is also preferred that the uppermost insert 162 is slightly larger in diameter than the lower inserts 120, and is seated on an annular shoulder 164 formed in the interior wall of the body portion 112. This provides a more positive location of the insert 162 for aligning the apertures 118, 122.

The upper ends of the stabiliser blades are preferably provided with a plurality of cutting elements (not shown) such as tungsten carbide cutters or polycrystalline diamond compact cutters. This allows the tool 110 to perform back-reaming cutting operations in the event that the drill string becomes trapped by a formation collapse or the like. The angled upper aperture 118 provides a jet of fluid which assists such back-reaming operations.

FIGS. 7 to 27 show a preferred embodiment of the invention, in which components corresponding to components of FIGS. 1 to 6 are given like reference numerals, prefixed "2". This embodiment is illustrated configured as a stabiliser, as in the second embodiment, but it will be appreciated that a similar arrangement of inserts and apertures could be incorporated in a slick sub configuration, as in the first embodiment.

The tool 210 of FIGS. 7 to 27 comprises a generally cylindrical body 212 having a box 214 and pin 216, and incorporating stabiliser blades 260, the geometry of which is simplified in the drawings for clarity. A plurality of generally cylindrical inserts 220 are located in the through bore of the body 212, each having a fluid aperture 222 aligned with a corresponding aperture 218 in the body 212. These apertures are omitted from FIG. 7 for clarity, and only a single set of apertures 218, 222 are shown in FIG. 8. It will be understood that the relative angular positions of the apertures 222 in each of the inserts 220, and of the corresponding apertures 218 in the body 212, may be varied as required, as discussed in relation to the previous embodiments.

This embodiment differs from the first and second embodiments principally with regard to the mechanism for producing the diverted fluid flow through he apertures 218, 222. In this case, the fluid diverting bulges provided on the inserts of the previous embodiments are omitted, and each of the apertures 218 of the body 212 is fitted with a normally-closed, pressure-responsive valve assembly 300, which also engages the outer surface of the corresponding insert 220. Fluid diversion is accomplished in this case by increasing the fluid pressure within the tool 210 so as to open the valves 300, allowing jets of fluid to exit the tool 210 via the apertures 218, 222.

Figure 13:
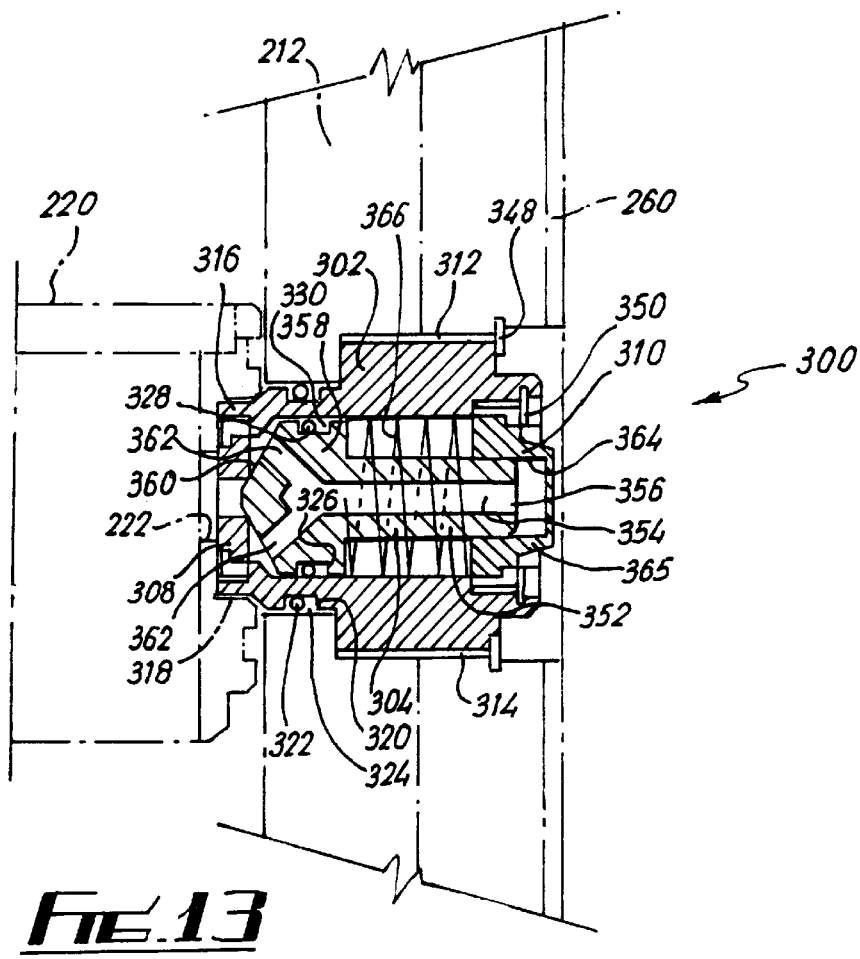
FIG. 13 is a sectional side view of a valve assembly forming part of the tool of FIG. 7.
Figure 14:
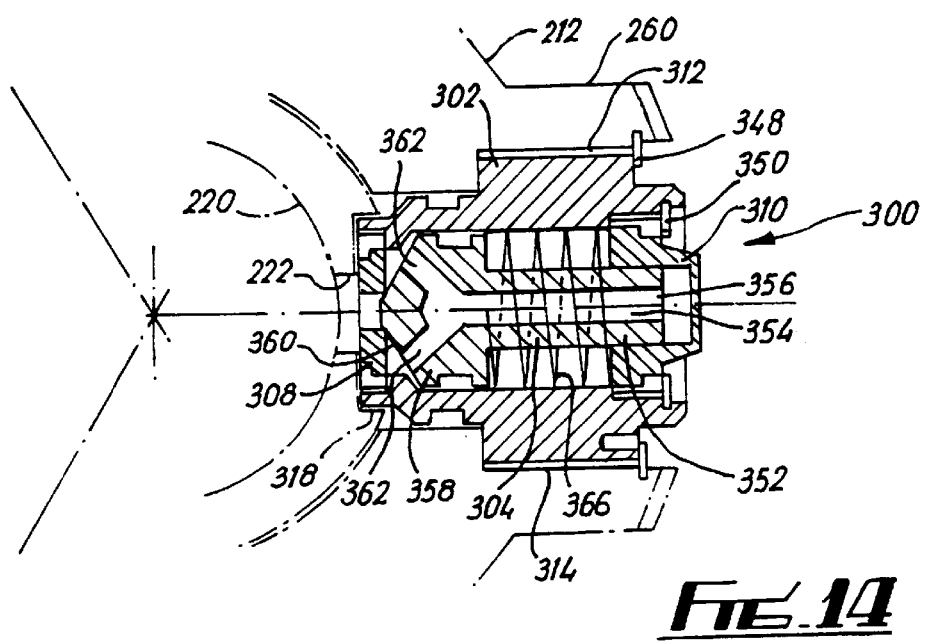
FIG. 14 is a sectional top view of the valve assembly of FIG. 13.
Figure 15:
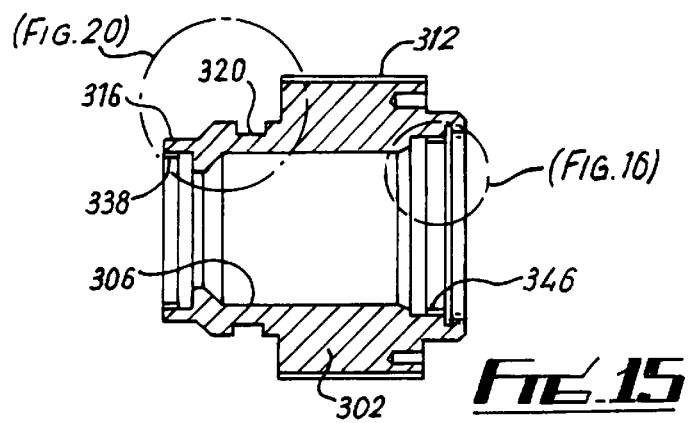
FIG. 15 is a sectional side view of a nozzle holder forming part of the valve assembly of FIGS. 13 and 14.
Figure 16:
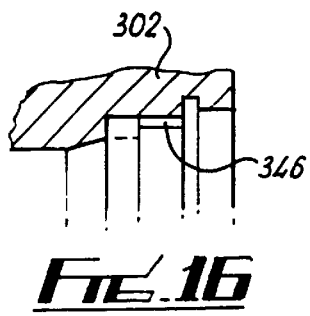
FIG. 16 is a detailed view of a portion of the nozzle holder of FIG. 15.
Figure 17:
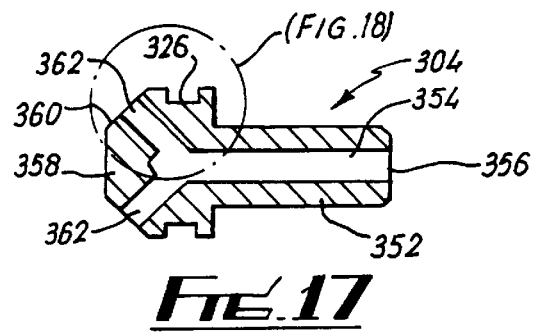
FIG. 17 is a sectional side view of a nozzle member forming part of the valve assembly of FIGS. 13 and 14.
Figure 18:
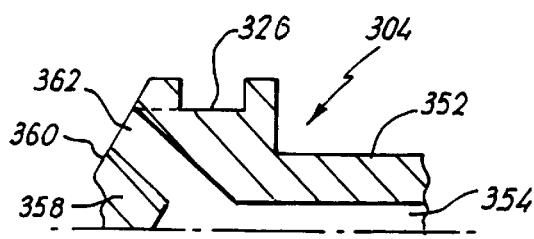
FIG. 18 is a detailed view of a portion of the nozzle member of FIG. 17.
Figure 19:
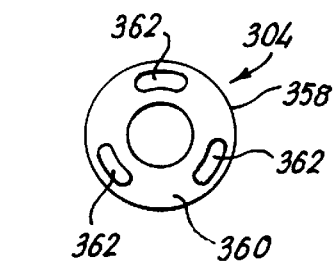
FIG. 19 is an end view of the nozzle member of FIG. 17.
Figure 20:
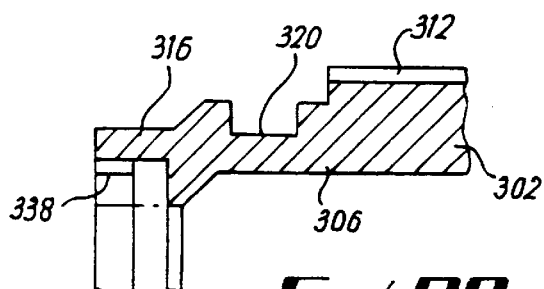
FIG. 20 is a detailed view of a further portion of the nozzle holder of FIG. 15.

As seen in FIGS. 13 and 14, the valve assemblies 300 each include a nozzle holder 302, and a spring-biased nozzle 304 mounted in a through bore 306 formed in the nozzle holder 302 between an inlet nozzle assembly 308 and an outer jet nozzle assembly 310. The nozzle holder 302 has an externally threaded outer portion 312 which engages an internally threaded middle portion 314 of the aperture 218 in the body 212 and an inner portion 316 which engages a counter-bore 318 surrounding the aperture 222 of the insert 220.

The nozzle holder 302 also includes a groove 320 on its outer surface for retaining an O-ring 322 and spiral back-up ring 324, or the like, which sealingly engage the surface of an inner portion of the aperture 218. The nozzle 304 includes a similar groove 326, O-ring 328 and spiral back-up ring 330, which sealingly engage the surface of the through bore of the nozzle holder 302. Details of the nozzle holder 302 are further illustrated in FIGS. 15, 16 and 17 and details of the nozzle 304 are further illustrated in FIGS. 17, 18 and 19.

The inlet nozzle assembly 308 comprises an inlet nozzle member 332 and a first locking collar 334 (FIGS. 21, 22). The first locking collar 334 has an external thread 336 which engages a corresponding internal thread 338 at the innermost end of the through bore of the nozzle holder 302. The outer jet nozzle assembly 310 comprises a jet nozzle member 340 and a second locking collar 342. The second locking collar 342 has an external thread 344 which engages a corresponding internal thread 346 at the outer end of the through bore of the nozzle holder 302.

For additional security, the nozzle holder 302 is retained in the aperture 218 by means of a first circlip 348. The jet nozzle assembly 310 is similarly retained in the through bore of the nozzle holder 302 by a second circlip 350.

The nozzle 304 comprises a generally cylindrical shaft portion 352 having a bore 354 formed therein. The bore 354 has a fluid outlet 356 at an outer, free end of the shaft 352. The other end of the shaft 352 is connected to a head portion 358, having a diameter greater than the shaft 352. The head 358 is generally cylindrical, and has a frusto-conical surface 360 formed at its inner end remote from the shaft 352. The groove 326 for the O-ring 328 and spiral back-up ring 330 is formed in the cylindrical outer surface of the head 358 rearwardly of the frusto-conical surface 360. A plurality of fluid inlet passages 362 extend inwardly from the frusto-conical surface 360 to intersect the bore 354. In this example there are three inlet passages 362, spaced equidistantly around the frusto-conical surface 360 and having a generally elliptical cross-sectional shape. The number and configuration of the inlet passages 362 may differ from the present example.

The nozzle 304 is slidably mounted in the bore 306 of the nozzle holder 302, with the outer end of its shaft 352 located in a bore 364 of the jet nozzle 340 of the jet nozzle assembly 310. The bore 364 of the jet nozzle 340 is closed at its outer end. A fluid outlet aperture is provided by a slot 365 formed in a frusto-conical outer surface of the jet nozzle 340.

The nozzle 304 is biased inwardly towards the interior of the tool by means of a coil spring 366, or other suitable resilient bias means, located between the jet nozzle assembly 310 and the shoulder formed between the shaft 352 and head 358 of the nozzle 304. The spring 366 urges the frusto-conical surface 360 of the nozzle 304 into engagement with a corresponding frusto-conical surface 368 surrounding an inlet aperture 370 of the inlet nozzle member 332 of the inlet nozzle assembly 308, thereby closing the valve assembly 300. Increasing the fluid pressure within the tool, in use, forces the nozzle 304 out of engagement with the inlet nozzle member 332, creating a fluid passage from the interior of the tool, via the apertures 222 of the inserts 220, the inlet aperture 370 of the inlet nozzle 332, the inlet passages 360, bore 354 and outlet 356 of the nozzle 304, and the bore 364 and outlet aperture 365 of the jet nozzle member 340, to the exterior of the tool.

The fluid pressure required to open the valve assemblies 300 may be adjusted by varying the size of the inlet aperture 370 of the inlet nozzle member 332, or the strength of the bias spring 366, or both. In the present example, varying the size of the inlet aperture 370 may vary the opening pressure of the valves in the range 50 to 300 bar for a given bias spring 366. The valve assemblies 300 close automatically when the internal fluid pressure is reduced, as the spring 366 urges the nozzle 304 back into engagement with the inlet nozzle member 332.

Besides its intended use as a fluid diverter tool, this embodiment of the invention might also be employed as a pressure relief tool to protect a mud motor located in a drill string downstream of the tool in the event that the motor stalls or the internal fluid pressure increases for other reasons.

Figure 12:
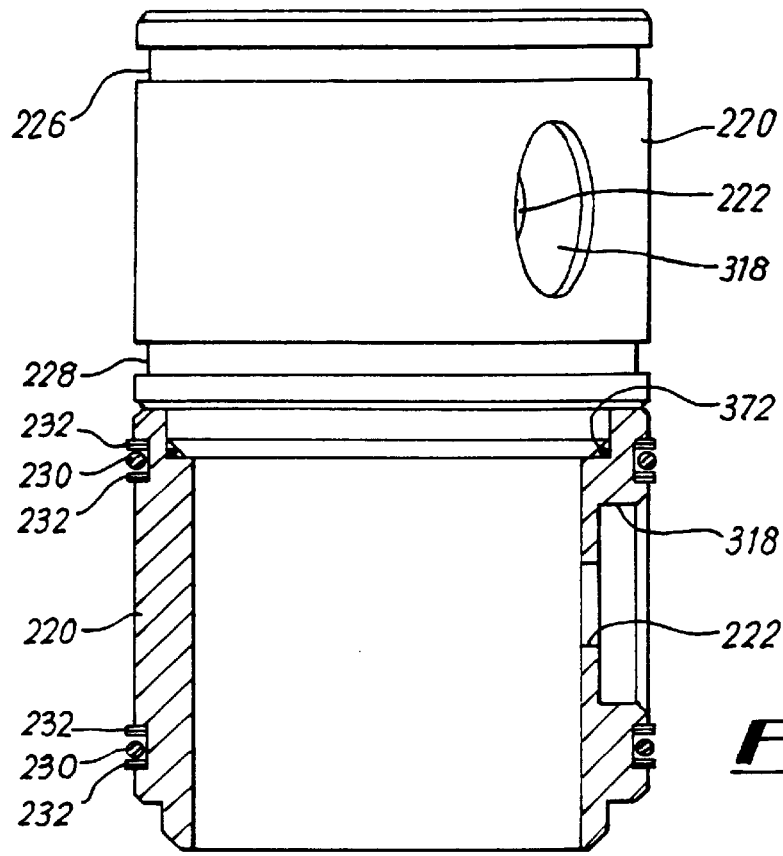
FIG. 12 is a side view of first and second inserts of the tool of FIG. 7, one of which is shown in section.

The inserts 220 of this embodiment are generally similar to those of the previous embodiments, including external grooves 226, 228 for O-rings 230 and spiral back-up rings 232, or the like, which form a seal with the interior of the cylindrical body 212. The upper and lower ends of the inserts 220 are configured with complementary shoulders, allowing the inserts to be stacked in nested fashion within the tool body, as best seen in FIG. 12. An O-ring 372 forms a fluid seal between adjacent inserts 220.

The through bore of the tool body 212 has a first, smallest internal diameter in the portion 374 thereof below the inserts 220, a second, intermediate internal diameter in the portion 376 in which the inserts 220 are located, and a third, largest internal diameter in the portion 378 above the inserts 220. The lowermost insert seats against a shoulder 380 formed between the lower and intermediate portions 374, 376. The shoulder 380 has a configuration similar to the upper ends of the inserts 220. In this example all of the inserts are substantially identical, except for the uppermost insert, the inlet end of which has a bevelled surface 382 to improve fluid flow (see FIG. 27). A similar arrangement of the inserts might also be applied to the first and second embodiments.

In this embodiment, the inserts 220, the nozzle 304, the inlet nozzle member 332 and the jet nozzle 340 are all formed from erosion resistant material such as tungsten carbide.

The invention thus provides an improved fluid diverter tool which can be deployed while drilling operations continue and which has high erosion resistance. The back-reaming stabiliser variant also provides a means for retrieving trapped drill strings. Both variants might be deployed in the same drill string.

Improvements and modifications may be incorporated without departing from the scope of the invention.

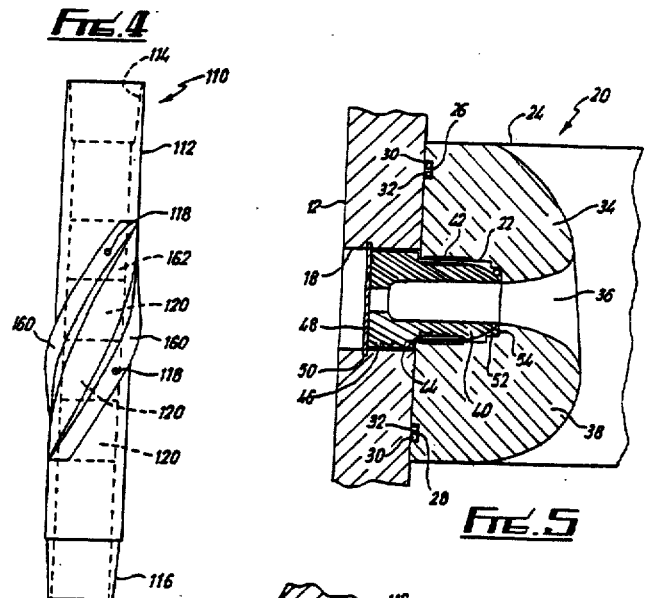

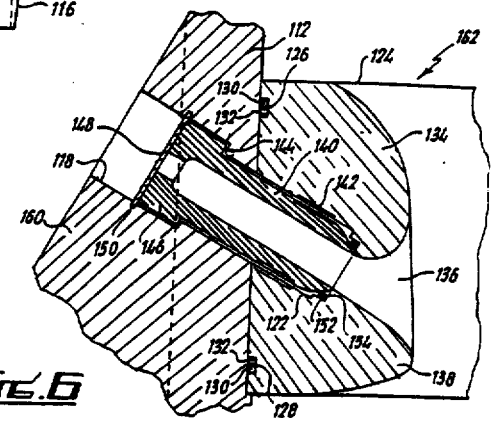

We claim:

1. A downhole fluid diverter tool comprising: a generally cylindrical body having an axial through-bore and adapted for connection within a drill string, said body having at least one aperture formed in a side wall thereof; at least one generally cylindrical insert having an axial through bore and having at least one aperture formed in a side wall thereof; means for locating said insert within said cylindrical body such that said apertures of the body and the insert are aligned with one another; and means whereby a proportion of a flow of drilling fluid passing through the cylindrical body, in use, may be diverted through said apertures.

wherein said at least one aperture in the cylindrical body is fitted with normally-closed, pressure-responsive valve means, said diversion of said drilling fluid being effected, in use, by increasing the fluid pressure in the interior of said cylindrical body such that said valve means open and a proportion of said drilling fluid exits from the cylindrical body through said at least one aperture; and wherein said valve means comprises a nozzle holder mounted in said aperture in said cylindrical body, a nozzle slidably mounted in said nozzle holder and having a fluid passage formed therethrough and resilient bias means adapted to urge said nozzle in a direction towards the interior of said tool so as to close said fluid passage.

2. A tool as claimed in claim 1, wherein said body has a plurality of apertures and said at least one insert provides a corresponding number of apertures aligned therewith.

3. A tool as claimed in claim 2, wherein an insert having a single aperture is provided for each aperture formed in the body, said apertures formed in the body being spaced along its length and said inserts being stacked in the interior thereof.

4. A tool as claimed in claim 2, wherein the apertures in the body are disposed in a helical path along its length.

5. A tool as claimed in claim 1, wherein said at least one insert is formed from erosion resistant material.

6. A tool as claimed in claim 5, wherein said material is tungsten carbide.

7. A tool as claimed in claim 1, further including nozzle means located in each of said apertures in said body.

8. A tool as claimed in claim 7, wherein said nozzle means are located in the apertures of said body and engage said inserts, thereby also providing said locating means.

9. A tool as claimed in claim 1, wherein the exterior walls of said at least one insert are adapted to sealingly engage the interior wall of said body.

10. A tool as claimed in claim 1, wherein said generally cylindrical body is further provided with a plurality of stabilising blades on its exterior surface and said apertures extend through said blades.

11. A tool as claimed in claim 10, wherein said blades are provided at their uppermost ends with cutting elements whereby rotation of the tool may provide a back-reaming action.

12. A tool as claimed in claim 11, wherein the uppermost aperture extends through one of said blades at an angle to the side wall of the cylindrical body, such that fluid diverted therethrough, in use, is directed upwardly.

13. A tool as claimed in claim 1, wherein said nozzle is adapted to move against the force of said resilient bias means in an outward direction, in response to a predetermined fluid pressure within the interior of said tool, so as to open said fluid passage.

14. A tool as claimed in claim 13, wherein said nozzle is mounted between a fluid inlet nozzle member located at an inner end of said nozzle holder and a jet nozzle located at an outer end of said nozzle holder.

15. A tool as claimed in claim 14, wherein said nozzle includes a head portion having a frusto-conical surface adapted to engage a corresponding surface of said inlet nozzle member when said valve is closed, and a shaft portion extending from said head portion and adapted to engage said jet nozzle.

16. A tool as claimed in claim 15, wherein said fluid passage in said nozzle comprises a plurality of passages extending through said head portion from said frusto-conical surface and intersecting a bore formed in said shaft portion.

17. A tool as claimed in claim 15, wherein said resilient bias element surrounds the shaft of said nozzle between the head portion thereof and said jet nozzle.

18. A tool as claimed in claim 14, wherein said nozzle, said inlet nozzle member and said jet nozzle are formed from erosion resistant material.

19. A tool as claimed in claim 18, wherein said erosion resistant material is tungsten carbide.

20. A downhole fluid diverter tool comprising: a generally cylindrical body having an axial through-bore and adapted for connection within a drill string, said body having at least one aperture formed in a side wall thereof; at least one generally cylindrical insert having an axial through bore and having at least one aperture formed in a side wall thereof; means for locating said insert within said cylindrical body such that said apertures of the body and the insert are aligned with one another; and means whereby a proportion of a flow of drilling fluid passing through the cylindrical body, in use, may be diverted through said apertures, wherein the interior surface of said at least one insert is configured in the vicinity of said aperture to effect said diversion of said drilling fluid;

wherein the interior wall of the insert in the vicinity of the aperture formed therein varies in thickness to provide a generally convex bulge around the aperture.

21. A tool as claimed in claim 20, wherein the walls of the entrance to the aperture converge in the direction extending towards the exterior surface of the insert and are generally convex in cross section.

22. A tool as claimed in claim 21, wherein the portion of the bulge lying below the aperture in the direction of fluid flow through the insert extends a greater distance towards the centre of the insert than does that portion lying above the aperture.

23. A downhole fluid diverter tool comprising: a generally cylindrical body having an axial through-bore and adapted for connection within a drill string, said body having at least one aperture formed in a side wall thereof; at least one generally cylindrical insert having an axial through bore and having at least one aperture formed in a side wall thereof; means for locating said insert within said cylindrical body such that said apertures of the body and the insert are aligned with one another; and means whereby a proportion of a flow of drilling fluid passing through the cylindrical body, in use, may be diverted through said apertures, including a plurality of said inserts, in which the upper end of each insert includes a shoulder adapted to be engaged by a corresponding shoulder formed on the lower end of a vertically adjacent insert.

24. A tool as claimed in claim 23, wherein the through-bore of said cylindrical body includes a lowermost portion having a first internal diameter smaller than the external diameter of said inserts, an insert-receiving portion having a second internal diameter larger than said first internal diameter and substantially equal to or greater than the external diameter of said inserts, and a shoulder formed between said lowermost portion and said insert-receiving portion, said shoulder being similar in configuration to the shoulder formed on the uppermost ends of said inserts.

25. A downhole fluid diverter tool comprising: a generally cylindrical body having an axial through-bore and adapted for connection within a drill string, said body having at least one aperture formed in a side wall thereof; at least one generally cylindrical insert having an axial through bore and having at least one aperture formed in a side wall thereof; means for locating said insert within said cylindrical body such that said apertures of the body and the insert are aligned with one another; and means whereby a proportion of a flow of drilling fluid passing through the cylindrical body, in use, may be diverted through said apertures;

wherein said body has a plurality of apertures and said at least one insert provides a corresponding number of apertures aligned therewith; and wherein an insert having a single aperture is provided for each aperture formed in the body, said apertures formed in the body being spaced along its length and said inserts being stacked in the interior thereof.

\* \* \* \* \*

UNITED STATES PATENT AND TRADEMARK OFFICE
CERTIFICATE OF CORRECTION

PATENT NO.    : 5,911,285
DATED         : June 15, 1999
INVENTOR(S)   : Arthur Deacey Stewart, et. al.

Page 1 of 4

It is certified that error appears in the above-identified patent and that said Letters Patent is hereby corrected as shown below:

The Title page showing illustrative figures, should be deleted and substitute therefor the attached Title page In the drawings, Figures 1-6 should be deleted to appear as per attached sheets.

Signed and Sealed this

Fifteenth Day of August, 2000

Attest:

Q. TODD DICKINSON

*Attesting Officer*  *Director of Patents and Trademarks*

United States Patent [19]

Stewart et al.

[11] Patent Number: 5,911,285

[45] Date of Patent: Jun. 15, 1999

[54] EROSION RESISTANT DOWNHOLE MUD DIVERTER TOOL

[76] Inventors: Arthur Deacey Stewart, The South Manse, Panmuir Gardens, Potterton, Aberdeen AB2 8EW, United Kingdom; Mark William Craig, 22 Woodend Drive, Aberdeen AB2 6YJ, United Kingdom

[21] Appl. No.: 08/776,550

[22] PCT Filed: Aug. 1, 1995

[86] PCT No.: PCT/GB95/01817

§ 371 Date: Jan. 31, 1997

§ 102(e) Date: Jan. 31, 1997

[87] PCT Pub. No.: WO96/04458

PCT Pub. Date: Feb. 15, 1996

[30] Foreign Application Priority Data

Aug. 1, 1994 [GB] United Kingdom ............... 9415500

[51] Int. Cl.$^6$ ........................................ E21B 21/10
[52] U.S. Cl. ............... 175/317; 166/222; 166/332.4; 175/324; 175/424
[58] Field of Search ........................ 175/324, 317, 175/424; 166/222, 332.4

[56] References Cited

U.S. PATENT DOCUMENTS

| 2,634,101 | 4/1953 | Sloan | 175/324 |
|---|---|---|---|
| 3,005,507 | 10/1961 | Clark, Jr. et al. | 175/324 |
| 3,208,527 | 9/1965 | Bayless | 166/313 |
| 3,358,770 | 12/1967 | Zandmer | 166/289 |
| 3,566,980 | 3/1971 | Scroggins | 175/317 |
| 3,997,010 | 12/1976 | Rilling | 175/317 |
| 4,341,273 | 7/1982 | Walker et al. | 175/339 |
| 4,583,603 | 4/1986 | Dorléans | 175/324 |
| 4,844,182 | 7/1989 | Tolle | 175/61 |
| 5,007,454 | 4/1991 | Lee, II | 137/508 |
| 5,407,020 | 4/1995 | Beavers | 175/317 |
| 5,533,571 | 7/1996 | Surjaatmadja et al. | 166/222 |

FOREIGN PATENT DOCUMENTS

| 1114067 | 5/1968 | United Kingdom . |
| 2054008 | 2/1981 | United Kingdom . |
| 2088931 | 6/1982 | United Kingdom . |
| 2170529 | 8/1986 | United Kingdom . |
| 93/25794 | 12/1993 | WIPO . |

Primary Examiner—Hoang C. Dang
Attorney, Agent, or Firm—Rather & Prestia

[57] ABSTRACT

An erosion resistant downhole diverter tool (210) comprises a generally cylindrical body (212) which may be configured as a slick sub or may include stabilizing blades (260). Located within the body 212 are a plurality of erosion-resistant, removable, cylindrical inserts (220). Each insert has an aperture (222) formed therein, aligned with a corresponding aperture (218) formed in the cylindrical body (212). Located within the apertures (218) in the cylindrical body (212) are pressure responsive, normally-closed valve assemblies (300), incorporating jet nozzles, which open in response to increased fluid pressure within the tool to provide fluid jets directed into the annulus surrounding the tool in a borehole or the like. The upper ends of the stabilizer blades (260) may include cutting structures to provide a back-reaming function. In alternative embodiments, the valve assemblies are omitted and replaced by simple jet nozzles, and the interior of the inserts is configured to promote fluid flow through the nozzles without increased fluid pressure. The inserts and nozzle components in contact with fluid are formed from erosion-resistant material. The tool allows fluid diversion functions to be performed without interrupting drilling operations.

25 Claims, 8 Drawing Sheets

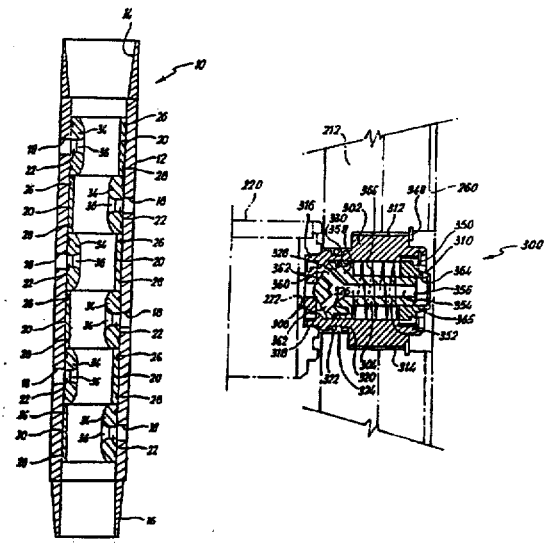

UNITED STATES PATENT AND TRADE MARK OFFICE
CERTIFICATE OF CORRECTION

PATENT NO. : 5,911,285
DATED : June 15, 1999
INVENTOR(S) : Stewart et al.

Page 3 of 4

It is certified that error appears in the above-identified patent and that said Letters Patent is hereby corrected as shown below:

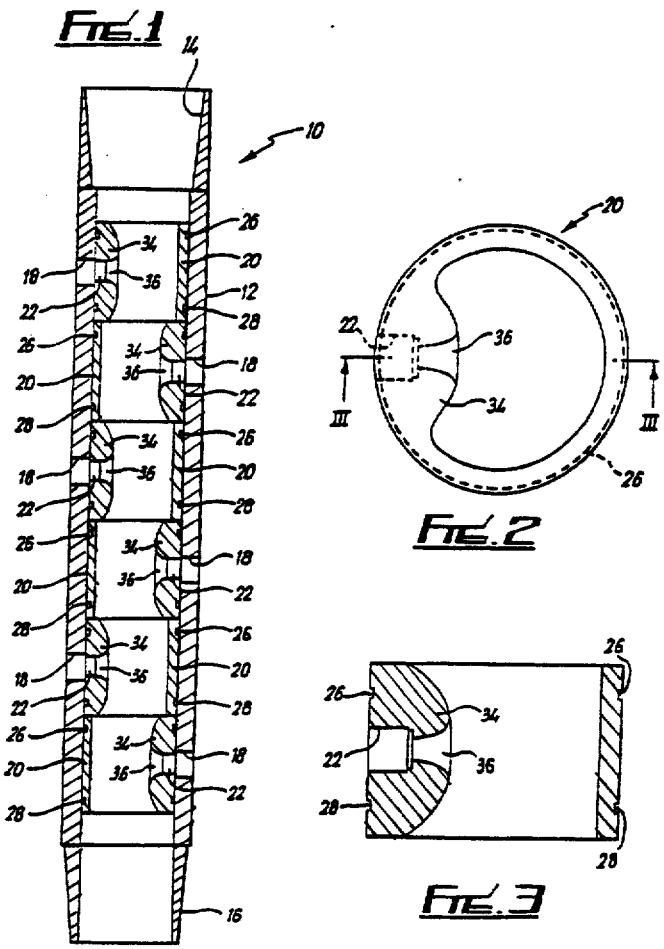

UNITED STATES PATENT AND TRADE MARK OFFICE
CERTIFICATE OF CORRECTION

PATENT NO. : 5,911,285
DATED : June 15, 1999
INVENTOR(S) : Stewart et al.

It is certified that error appears in the above-identified patent and that said Letters Patent is hereby corrected as shown below: